(12) United States Patent
Chen (10) Patent No.: US 11,506,559 B2
(45) Date of Patent: Nov. 22, 2022

(54) SERVICE LIFE TESTING DEVICE FOR PRESSURE SENSOR AND TESTING METHOD USING SAME

(71) Applicant: METAL INDUSTRIES RESEARCH&DEVELOPMENT CENTRE, Kaohsiung (TW)

(72) Inventor: Shuo-Ching Chen, Kaohsiung (TW)

(73) Assignee: METAL INDUSTRIES RESEARCH&DEVELOPMENT CENTRE, Kaohsiung (TW)

( * ) Notice: Subject to any disclaimer, the term of this patent is extended or adjusted under 35 U.S.C. 154(b) by 203 days.

(21) Appl. No.: 17/134,851

(22) Filed: Dec. 28, 2020

(65) Prior Publication Data

US 2022/0205860 A1 Jun. 30, 2022

(51) Int. Cl.
*G01L 25/00* (2006.01)

(52) U.S. Cl.
CPC ................... *G01L 25/00* (2013.01)

(58) Field of Classification Search
CPC ....... G01L 25/00; G01L 27/005; G01R 31/00; G01R 31/2601; G01R 31/2867; G01R 31/2893; G01N 3/34; G01M 5/0058
See application file for complete search history.

(56) References Cited

U.S. PATENT DOCUMENTS

| 6,304,073 | B1* | 10/2001 | Saito | ............ | G01R 31/01 |
| | | | | | 324/757.04 |
| 7,806,031 | B1* | 10/2010 | Rytz | ............ | B21D 28/16 |
| | | | | | 83/639.1 |
| 2020/0191622 | A1* | 6/2020 | Suga | ............ | G01R 31/2874 |

FOREIGN PATENT DOCUMENTS

| TW | 483525 U | 4/2002 |
| TW | I674959 B | 10/2019 |

* cited by examiner

*Primary Examiner* — Brandi N Hopkins
(74) *Attorney, Agent, or Firm* — WPAT, PC (57) ABSTRACT

A service life testing device for a pressure sensor includes a first and a second plates, the first plate including a stage carrying a to-be-tested pressure sensor; a pair of drivers, two ends thereof respectively connected to the first and the second plates; a pair of linear slide mechanisms, disposed between the first and the second plates, and each including a slide rail and a slider moving there along, where a compression spring is disposed along an axial direction of each slide rail; a jig, disposed between the first and the second plates, and facing the to-be-tested pressure sensor; and a processing unit, electrically connected to the drivers and the to-be-tested pressure sensor, and configured to control a moving direction, a moving speed, and a moving stroke of the drivers, to cause the to-be-tested pressure sensor to press against or move away from a surface of the jig.

14 Claims, 8 Drawing Sheets

SERVICE LIFE TESTING DEVICE FOR PRESSURE SENSOR AND TESTING METHOD USING SAME

BACKGROUND

Technical Field

The present invention relates to a service life testing device and testing method, and in particular, to a service life testing device and testing method for periodically simulating a pressure-time curve of a pressure sensor in a service environment and recording, analyzing, and comparing testing data of the pressure sensor to determine the service life of the pressure sensor.

Related Art

Taiwan Patent Application No. TWI674959B entitled "SENSING DEVICE OF PRESSURE AND TEMPERATURE IN MOLD" previously disclosed by the inventor is a pressure and temperature sensing device in a mold, and in particular, to a sensing device for real-time measurement of in-mold pressure and temperature changes at the same position in a mold cavity. In order to prove the reliability of the service life of the device, for example, when applied to a die-casting process, it is necessary to design a service life testing platform for simulating a service environment of a to-be-tested sensor and temperature and pressure changes experienced by the sensor installed in the environment in a service cycle, and periodically repeating the simulation until the to-be-tested sensor fails.

Taiwan Patent Application No. TWBN-483525 "FIXED PRESSURE TEST MECHANISM" discloses a fixed pressure test mechanism. The mechanism is mainly a test device where a vertically slidable slide rod is disposed on a horizontally movable fixing plate by using a bushing, a base is fixedly disposed at a bottom end of the slide rod below the fixing plate, and a probe is disposed on the base. The test device is characterized in that the test device is mainly formed by a hollow cylinder, a stepped hole for sliding of the probe is formed inside the cylinder, a plug portion capable of achieving a piston effect with the stepped hole is formed at a top end of the probe, an inverted tapered probe tip is provided at a bottom end of the probe, and air may flow into the cylinder from above or below the probe, so that the probe can obtain a fixed pressure, thus forming a fixed pressure test mechanism capable of keeping the downward pressure unchanged. However, this patent mainly focuses on how to keep the test pressure of the mechanism unchanged to maintain the accuracy of the test, and uses a probe to contact with a contact panel to balance the air pressure output.

SUMMARY

An objective of the present invention is to repeatedly control, according to a pressure-time curve in an actual use period of a to-be-tested pressure sensor, a driver to provide a simulated pressure-time environment, and compare data actually recorded by the to-be-tested pressure sensor to determine whether the service life comes to an end.

To achieve the foregoing objective, the present invention provides a service life testing device for a pressure sensor, applicable to periodically testing a to-be-tested pressure sensor in a simulated application environment, where the to-be-tested pressure sensor comprises a sensing port receiving a pressure, and the service life testing device comprises the following structures: a first plate, comprising a stage configured to carry the to-be-tested pressure sensor; a second plate, parallel to the first plate, and comprising a plate surface facing the stage; a pair of drivers, disposed between the first plate and the second plate, where a first end of each of the drivers is connected to the first plate, and a second end of each of the drivers opposite to the first end is connected to the second plate; a pair of linear slide mechanisms, disposed between the first plate and the second plate, and each comprising a slide rail and a slider moving linearly along the slide rail, where a compression spring is disposed along an axial direction of each of the slide rails; a jig, disposed between the first plate and the second plate, and facing the to-be-tested pressure sensor; and a processing unit, electrically connected to the pair of drivers and the to-be-tested pressure sensor, and configured to control a moving direction, moving speed, and moving stroke of the pair of drivers according to a control signal, to cause the to-be-tested pressure sensor to press against or move away from a surface of the jig.

In some implementations, a pair of limiting blocks are respectively disposed on the pair of slide rails between the first plate and the pair of compression springs.

In some implementations, the pair of drivers may be motor drivers, cylinder drivers, or pneumatic tendon drivers.

In some implementations, the service life testing device further comprises a stage pressure gauge electrically connected to the processing unit, disposed between the sliders and the second plate, and configured to measure a pressure actually applied on the to-be-tested pressure sensor by the pair of linear slide mechanisms.

The present invention has at least the following characteristics: in an embodiment of the present invention, pneumatic tendon drivers are used to control a relative movement between a first temperature control jig and a second temperature control jig. Therefore, control of a ratio of simulated time to a displacement (controllable pressure) can be provided. In an embodiment of the present invention, the pneumatic tendon drivers are used to control the relative movement between the first temperature control jig and the second temperature control jig. A quick restoring capability is therefore provided and is extremely applicable to a field of service life testing requiring repeated actuation in the present invention. Time for a device restoration can be significantly reduced. The present invention provides a simulation of an actual working environment. A service life close to a service life in an actual use environment therefore can be obtained during a test. The pressure-time curve during the test may be further compared with an actual pressure-time curve to further monitor the magnitude of an error in real time to provide a basis for determining whether to stop the test, thereby saving time wasted by improper tests. The present invention provides synchronously-sensed actual pressure and temperature and pressure-temperature data of the to-be-tested sensor to obtain a sensing accuracy of the to-be-tested sensor. In the past, because force testing and calibrating devices are limited by a constant applied pressure or a constant environmental temperature, many actual industrial use environments cannot be simulated, and the service life of a sensor cannot be tested. However, testing device and testing method established in the present invention can perform performance verification and service life testing on a sensor. The testing device and the testing method provided in the present invention are applicable to pressure/temperature sensor calibration and service life determination, thereby saving entire test time, material costs, and labor costs, and exploiting a new application market.

DETAILED DESCRIPTION

Embodiments of the present invention are described in detail below with reference to the accompanying drawings. The accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the specification and size of the components are actually an optional design, and the layout of the components may be more complex.

The following description of various embodiments is provided to exemplify the specific embodiments for implementation of the present invention with reference to accompanying drawings. The directional terms mentioned in the present invention, for example, "upper", "lower", "before", "after", "left", "right", "inside", "outside", and "side", merely refer to directions in the accompanying drawings. Therefore, the used direction terms are intended to describe and understand this application, but are not intended to limit this application. In addition, in the specification, unless explicitly described as contrary, the word "include" is understood as including the component, but does not exclude any other components.

Figure 1:
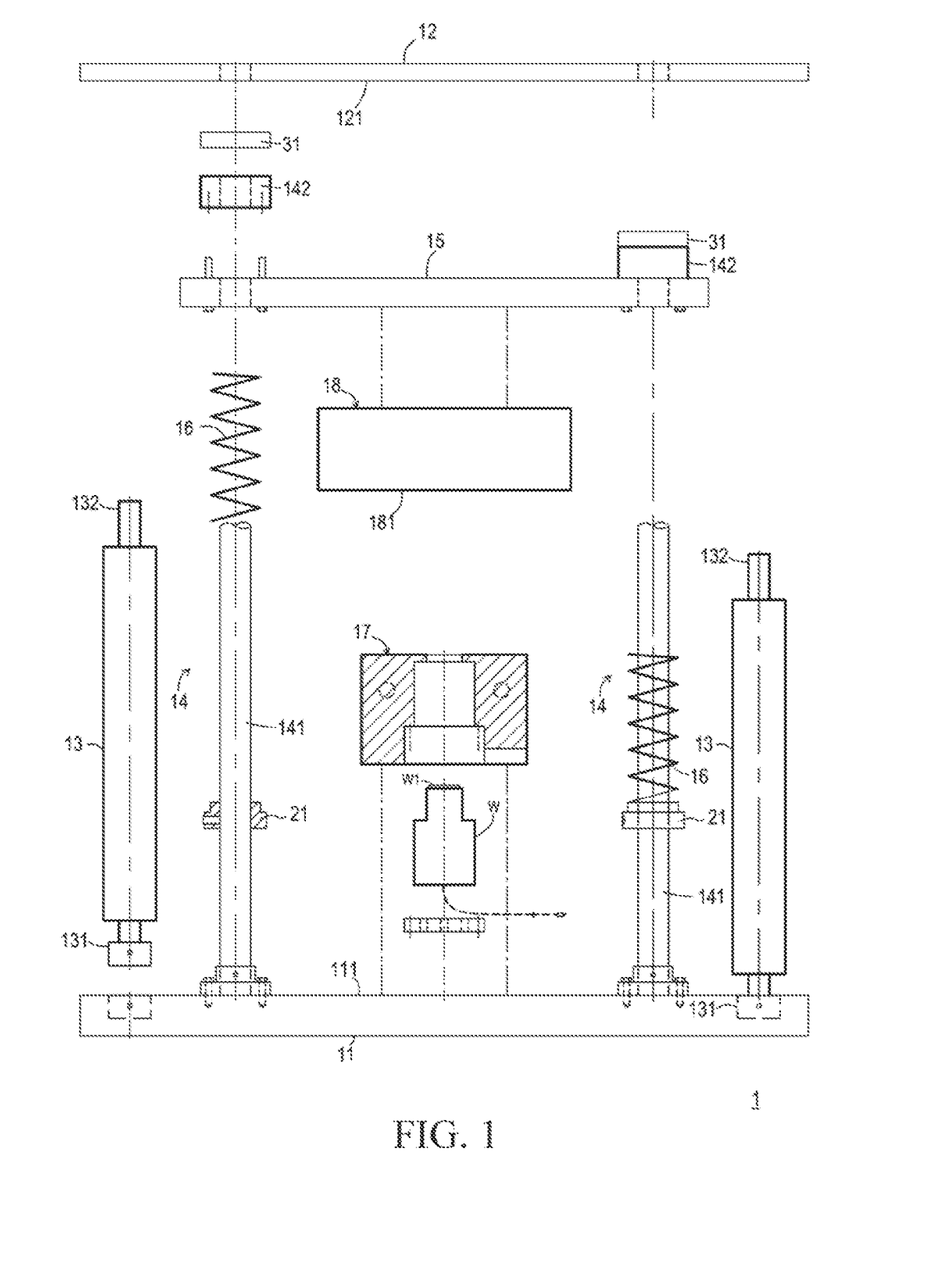
FIG. 1 is an exploded schematic front view of a service life testing device for a pressure sensor according to an embodiment of the present invention.
Figure 2:
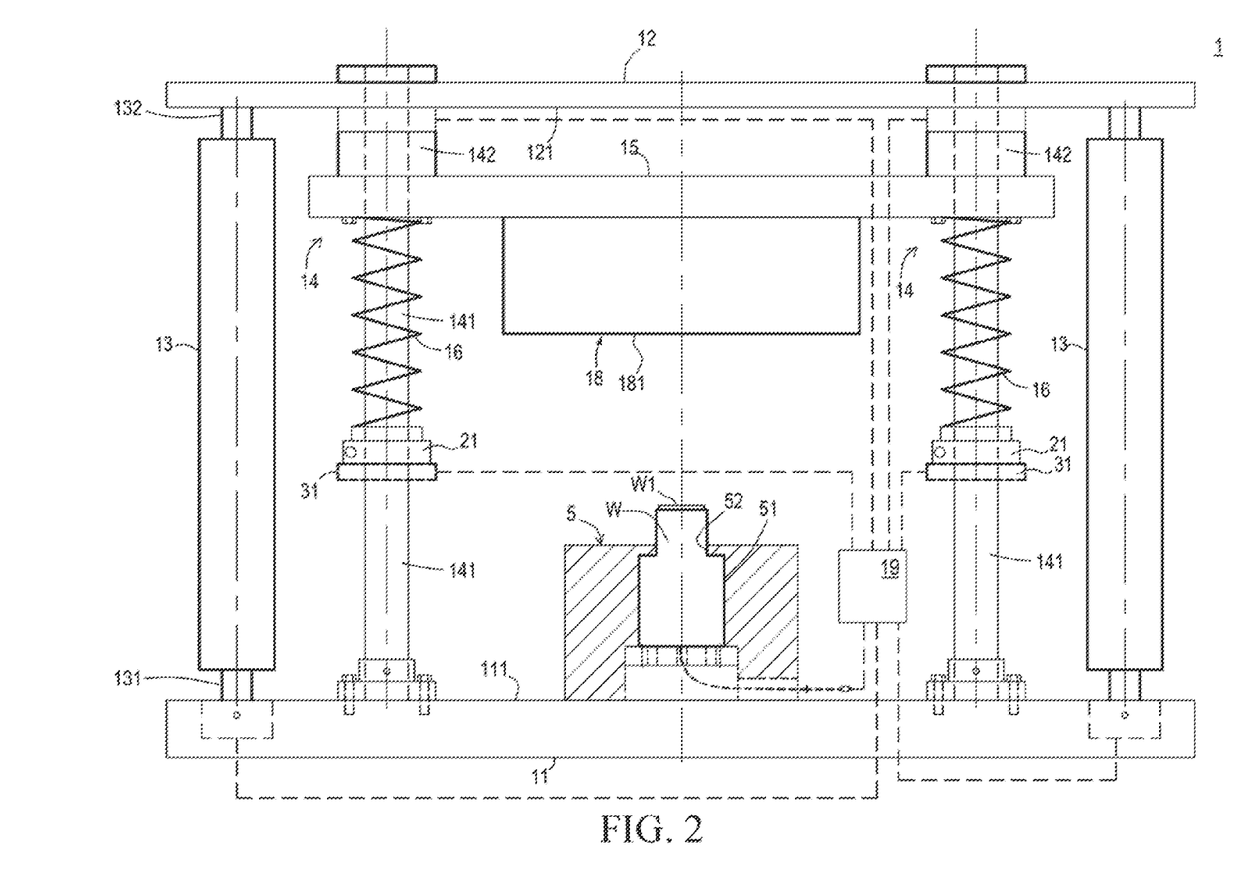
FIG. 2 is a front view of a relevant position of a service life testing device for a pressure sensor at a preliminary stage according to an embodiment of the present invention.

Refer to FIG. 1 and FIG. 2, in the embodiments, a service life testing device 1 for a pressure sensor may be suitable for periodically testing a to-be-tested pressure sensor W in a simulated application environment. The to-be-tested pressure sensor W includes a sensing port W1 configured to receive a pressure. The service life testing device 1 for a pressure sensor includes the following structures:

a first plate 11, including a stage 111, the stage 111 being capable of carry the to-be-tested pressure sensor W; and a second plate 12, parallel to the first plate 11, and including a plate surface 121 facing the stage 111.

A pair of drivers 13 is further included, disposed between the first plate 11 and the second plate 12, where a first end 131 of the driver 13 is connected to the first plate 11, a second end 132 of the driver 13 opposite to the first end 131 is connected to the second plate 12, so that the driver 13 can horizontally move the second plate 12 relative to the first plate 11, where a moving speed thereof depends on attributes of the driver 13. For example, the driver 13 may be a motor driver, a cylinder driver, or a pneumatic tendon driver. Compared with motor drivers, when the driver 13 is a pneumatic tendon driver, the second plate 12 can be driven back and forth more powerfully and more quickly, so that acceleration, deceleration, or a moving direction change can be performed quickly in an extremely short time.

A pair of linear slide mechanisms 14 is further included, disposed between the first plate and the second plate, and each including a slide rail 141 and a slider 142 moving linearly along the slide rail 141. A compression spring 16 is disposed along an axial direction of a central axis of each of the slide rails 141. In the embodiments shown in FIG. 1 and FIG. 2, the slide rail 141 may be a smooth shaft, and the slider 142 may be a block running through the smooth shaft. The slide rail 141 is secured to the first plate 11. The slider 142 is secured to the second plate 12. Besides, in one of actual implementation aspects, a connection pad 15 separately connected to the pair of sliders 142 may be used. The pair of sliders 142 and the connection pad 15 may be integrally formed and presented as one component. The to-be-tested pressure sensor W may be directly disposed on the stage 111 or indirectly disposed on the stage 111 through a fixture 17 mounted on the stage 111.

A jig 18 is further included, disposed between the first plate 11 and the second plate 12, for example, disposed on the stage 111 or the connection pad 15. In addition, a surface 181 of the jig 18 faces the to-be-tested pressure sensor W.

A processing unit 19 is further included, electrically connected to the pair of drivers 13 and the to-be-tested pressure sensor W, and configured to control a moving direction, a moving speed, and a moving stroke of the pair of drivers 13, so that the slider 142 moves along the slide rail 141 through a displacement of the second plate 12, to further drive the connection pad 15 actuate synchronously, to control the jig 18 disposed on the connection pad 15 or the second plate 12 to move in a straight line relative to the to-be-tested pressure sensor W, causing the surface 181 to press against or move away from the sensing port W1 of the to-be-tested pressure sensor W. Pressure data may be sensed by the sensing port W1 and transmitted back to the processing unit 19.

In the foregoing embodiments, the pair of compression springs 16 may be respectively sleeved on the slide rails 141 to keep compression and rebound paths on a straight line. A limiting block 21 secured to the slide rail 141 is disposed between the first plate 11 and each of the compression springs 16, to define an ending position of a downward compression stroke of the compression spring 16, that is, the limiting block 21 may be used for controlling a lowest stroke position of the jig 18.

In addition, in order to check whether force control of the service life testing device 1 for a pressure sensor operates normally, the service life testing device 1 for a pressure sensor further includes a stage pressure gauge 31 electrically connected to the processing unit 19, and configured to measure a pressure actually applied on the to-be-tested pressure sensor W by the pair of linear slide mechanisms 14, and transmit sensing data back to the processing unit 19. The stage pressure gauge 31 may be disposed between the slider 142 and the second plate 12. That is, the stage pressure gauge 31 is secured to the second plate 12, and then the slider 142 is disposed on the stage pressure gauge 31. The stage pressure gauge 31 may be alternatively disposed between the limiting block 21 and the slide rail 141. That is, the stage pressure gauge 31 is secured to the slide rail 141, and the limiting block 21 is secured to the stage pressure gauge 31.

Figure 5:
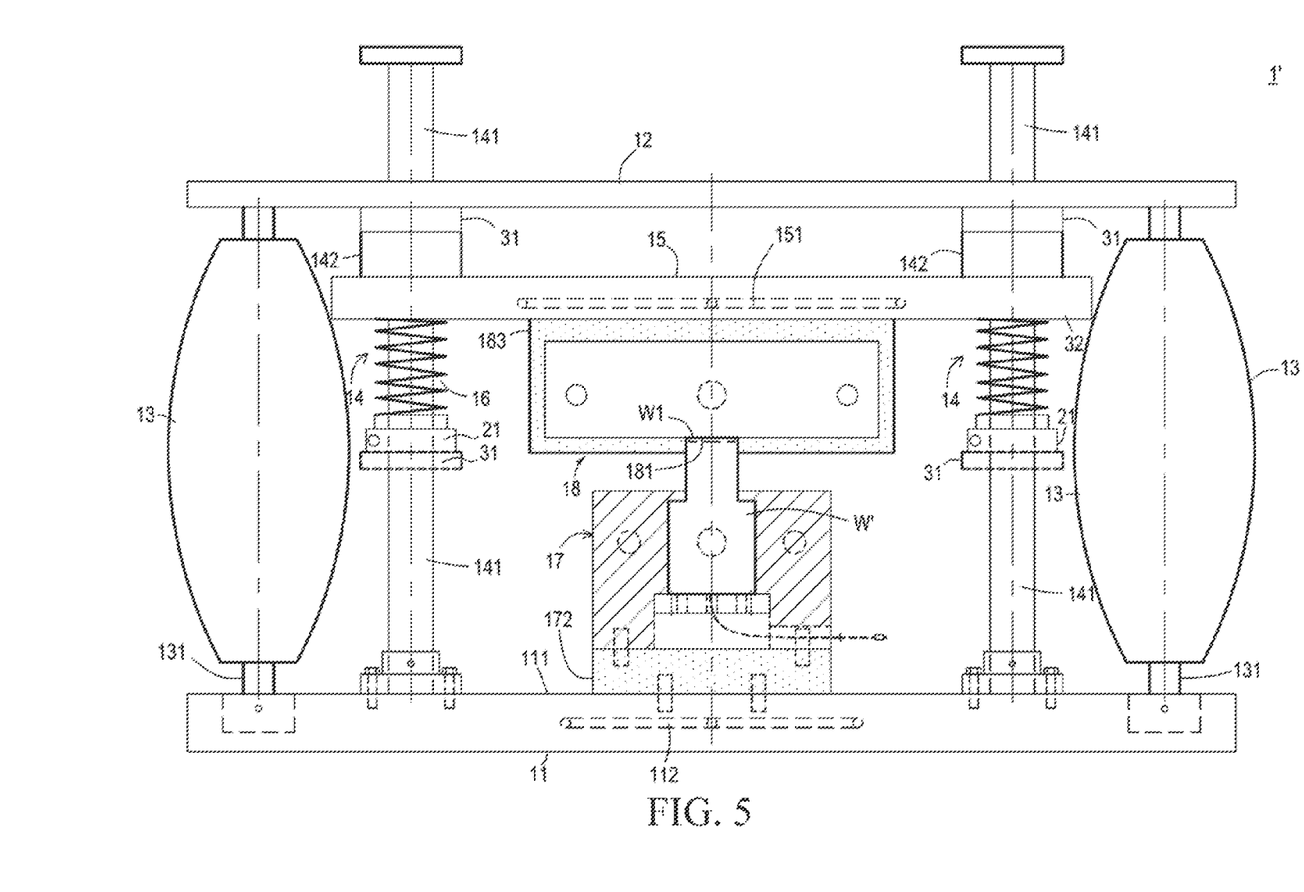
FIG. 5 is a front view of a relevant position of the service life testing device for a pressure sensor at a pressurization stage according to the embodiment in FIG. 4.

It is worth mentioning that as shown in FIG. 5, the stage pressure gauge 31 may be alternatively disposed at a locking joint of the first end 131 of the driver 13 for an indirect pressure measure. Alternatively, the stage pressure gauge 31 may be disposed between a first thermal insulation member 172 and the stage 111 or between a second thermal insulation member 183 and the connection pad 15 for a direct pressure measure through no other component. For example, it is necessary to subtract a relative impact value caused by a reaction force probably applied by the compression spring 16, then a measured pressure value can be obtained. However, because the position is near a first temperature control unit 171 or a second temperature control unit 182, it is preferable to choose a stage pressure gauge 31 with high-temperature resistance.

Figure 3:
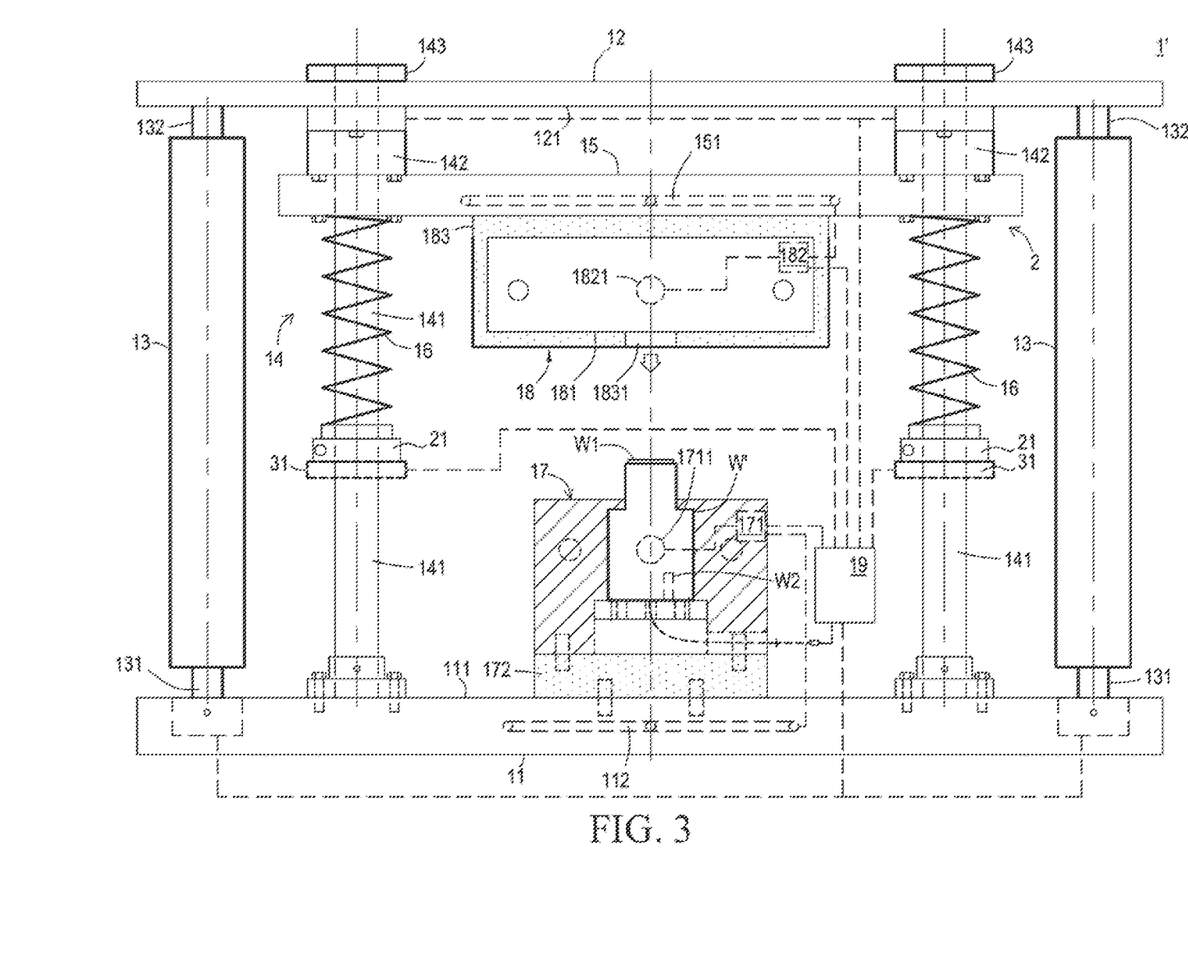
FIG. 3 is a front view of a relevant position of a service life testing device for a pressure sensor with a temperature change at a preliminary stage according to an embodiment of the present invention.

As shown in FIG. 3, in another embodiment, a to-be-tested pressure sensor W' is applicable to an environment with a temperature change. A service life testing device 1' for a pressure sensor may be used to test the service life of the pressure sensor W'. The to-be-tested pressure sensor W' may include a temperature sensor W2 configured to measure a temperature of the sensing port W1, and the temperature sensor W2 is electrically connected to the processing unit 19 of the service life testing device 1' for a pressure sensor. The fixture 17 may further include the first temperature control unit 171 for temperature controlling (heating, cooling, and temperature measuring) of the fixture 17. The jig 18 includes the second temperature control unit 182 for temperature controlling (heating, cooling, and temperature measuring) of the jig 18. The first temperature control unit 171 and the second temperature control unit 182 are electrically connected to the processing unit 19 separately.

Based on the above, the first temperature control unit 171 includes a first thermometer 1711 configured to measure the temperature of the fixture 17, and the second temperature control unit 183 includes a second thermometer 1831 configured to measure a temperature of the jig 18.

Even, the first temperature control unit 171 can include a first cooling circulation unit 1712 disposed on the first plate 11, and the second temperature control unit 183 includes a second cooling circulation unit 1832 disposed on a connection pad 15.

By using the foregoing components, the processing unit 19 may control, according to requirements, the first temperature control unit 171 to heat the fixture 17 to a required temperature and perform a cooling process through the first cooling circulation unit 1712 according to a real-time temperature of the fixture 17 fed back by the first thermometer 1711, to achieve the objective of temperature controlling. Similarly, the processing unit 19 may control, according to requirements, the second temperature control unit 183 to heat the jig 18 to a required temperature and perform a cooling process through the second cooling circulation unit 1832 according to a real-time temperature of the jig 18 fed back by the second thermometer 1831, to achieve the objective of temperature controlling.

As shown in FIG. 3, to keep the temperatures of the fixture 17 and the jig 18 steady, the first thermal insulation member 172 may be disposed on a surface of the fixture 17 in contact with the first plate 11, and the second thermal insulation member 183 is disposed on a surface of the jig 18 in contact with the second plate 12. Even, in order to reduce negative impacts on surrounding components caused by thermal radiation of the heated jig 18, in a preferable implementation, the second thermal insulation member 183 may be disposed on each surface of the jig 18, and includes an opening 1831 on a surface facing the to-be-tested pressure sensor W' for the sensing port W1 to pass through.

In addition, as shown in FIG. 3, after the driver 13 releases the second plate 12, the second plate 12 may rebound under a restoring force of the compression spring 16. Because the rebound force is quite large, in order to avoid collision damages of components, a shock-absorption cushioning material may be applied at an end of the guide rail 141. For example, a stop 143 made from materials such as polyurethane is disposed, to overcome the problem.

Figure 6:
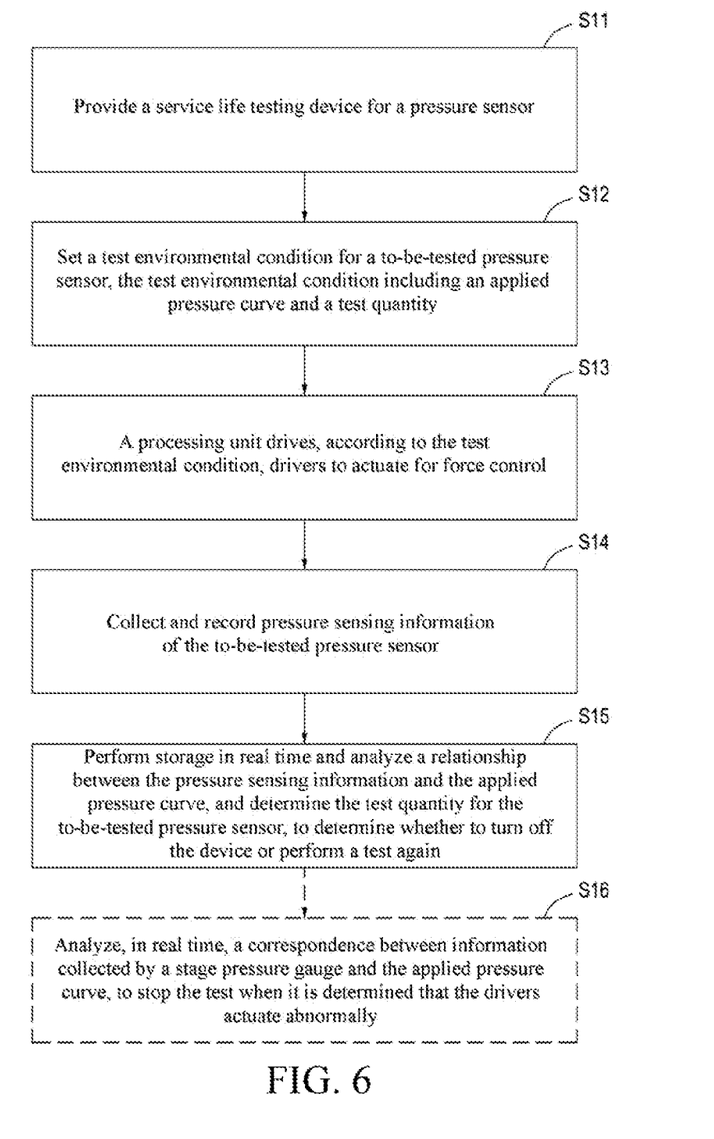
FIG. 6 is a flowchart of a service life testing method for a pressure sensor according to an embodiment of the present invention.

Refer to FIG. 6 and FIG. 2, in an embodiment of a service life testing method for a pressure sensor, following steps are included. Step S11: Provide the service life testing device 1 for a pressure sensor without the first temperature control unit 171 and the second temperature control unit 183 according to the embodiments shown in FIG. 1 and FIG. 2.

Subsequent step S12: Set a test environmental condition for the to-be-tested pressure sensor W, the test environmental condition including an applied pressure curve C1 and a test quantity. The applied pressure curve C1 indicates a situation where the service life testing device 1 for a pressure sensor correspondingly drives the driver 13 to change the applied pressure on the to-be-tested pressure sensor with time.

Step S13: The processing unit 19 drives, according to the test environmental condition, the pair of drivers 13 to actuate for force control.

Step S14: Collect and record pressure sensing information of the to-be-tested pressure sensor W.

Step S15: Perform storage in real time and analyze a relationship between the pressure sensing information and the applied pressure curve C1, and determine the test quantity for the to-be-tested pressure sensor W, to determine whether to turn off the device or perform a test again. That is, when the test quantity of the to-be-tested pressure sensor W reaches a test quantity set in the foregoing test environmental condition, the test is stopped. When the set test quantity is not reached, the test quantity is added up, and the test is redone.

In addition, as shown in FIG. 6, in order to determine whether a pressure in the service life testing device 1 for a pressure sensor during force outputting is the same as a corresponding pressure on the applied pressure curve C1, a step may be included, that is, step S16: analyze, in real time, a correspondence between pressure sensing information C3 collected by the stage pressure gauge 31 and the applied pressure curve C1, to stop the test when it is determined that the pair of drivers 13 actuate abnormally.

Figure 4:
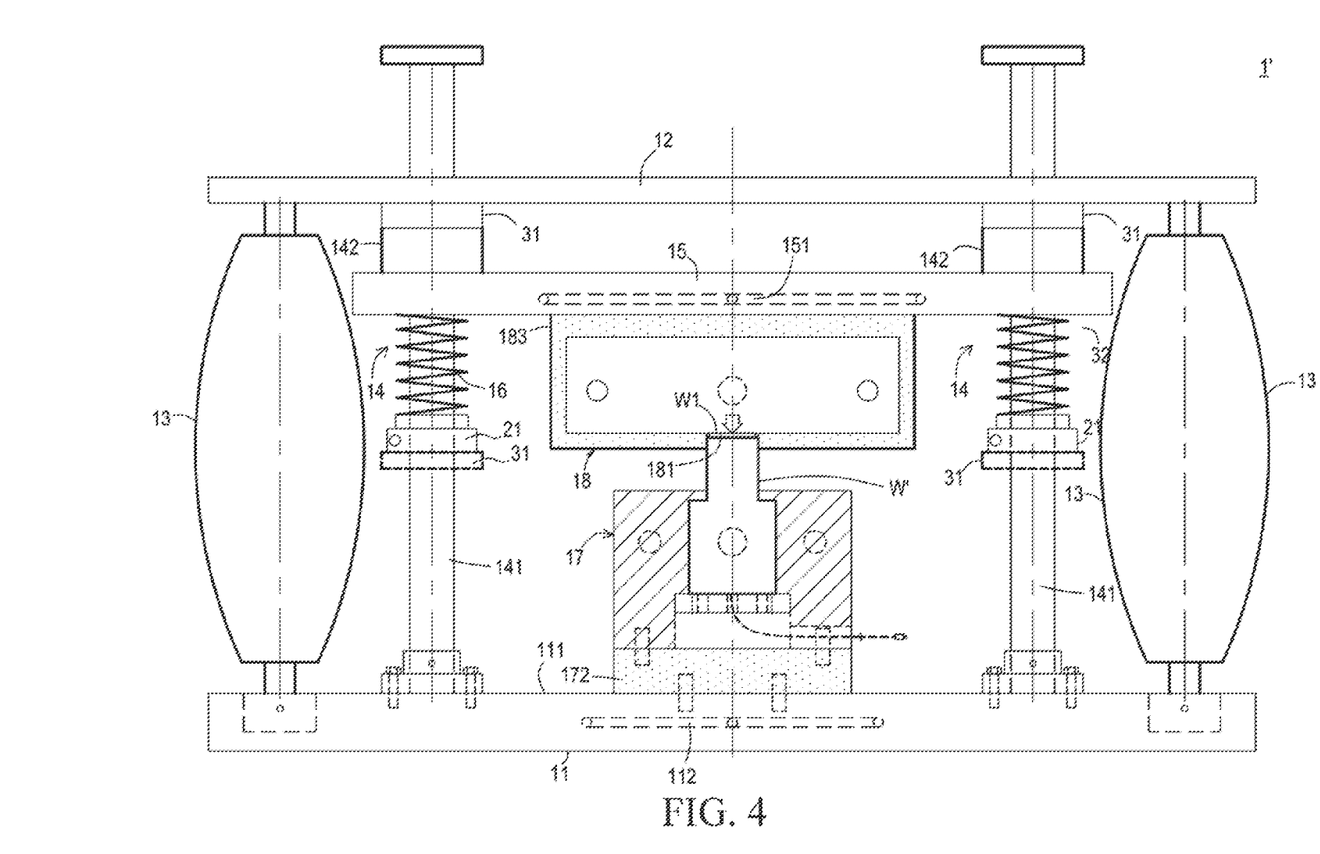
FIG. 4 is a front view of the relevant position of the service life testing device for a pressure sensor at an initial stage according to the embodiment in FIG. 3.

As shown in FIG. 7, FIG. 3, FIG. 4, and FIG. 5, in another embodiment of a service life testing method for a pressure sensor, following steps are included. Step S21: Provide the service life testing device 1' for a pressure sensor according to the embodiment shown in FIG. 3. It is worth mentioning that the service life testing device 1' for a pressure sensor (including the foregoing service life testing device 1 for a pressure sensor) may use the driver 13 to perform actions including a preliminary stage, an initial stage, a pressurization stage, and a pressure reduction or pressure removal stage. Description of each stage is as follows:

FIG. 3 shows relative positions of the jig 18 and the to-be-tested pressure sensor W' at the preliminary stage: the to-be-tested pressure sensor W' is separated from a surface 181; FIG. 4 shows relative positions of the jig 18 and the to-be-tested pressure sensor W' at the initial stage: the to-be-tested pressure sensor W' is pressed against the surface 181; FIG. 5 shows relative positions of the jig 18 and the to-be-tested pressure sensor W' at the pressurization stage: the jig 18 is driven to move toward the fixture 17 to increase a pressure applied by the surface 181 on the sensing port W1 of the to-be-tested pressure sensor W'; and FIG. 4 of FIG. 3 shows relative positions of the jig 18 and the to-be-tested pressure sensor W' at the pressure reduction or pressure removal stage: the jig 18 is driven to move away from the fixture 17, that is, away from the to-be-tested pressure sensor W' so as to reduce and remove the pressure of the to-be-tested pressure sensor W'.

Figure 7:
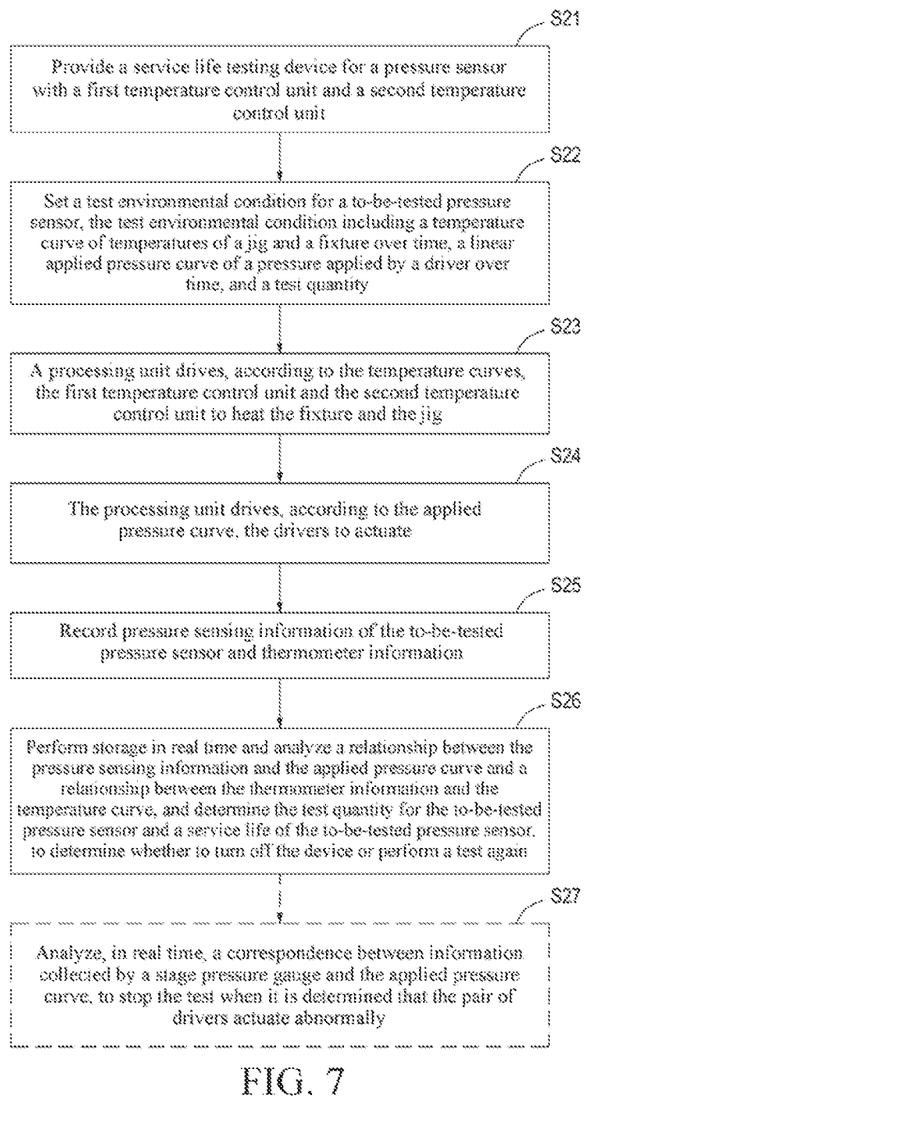
FIG. 7 is a flowchart of a service life testing method for a pressure sensor according to another embodiment of the present invention.

After step S21, step S22 is subsequently performed, that is, set a test environmental condition for the to-be-tested pressure sensor W', the test environmental condition including a temperature curve of the temperatures of the jig 18 and the fixture 17 over time (not shown in the figure), an applied pressure curve C1 of a pressure applied by the driver 13 over time, and a test quantity.

Step S23: The processing unit 19 drives, according to the temperature curve, the first temperature control unit 171 and the second temperature control unit 183 to heat the fixture 17 and the jig 18 to fit temperature changes of the temperature curves.

Step S24: The processing unit 19 drives, according to the applied pressure curve C1, the pair of drivers 13 to actuate, to cause the pressure applied on the to-be-tested pressure sensor W' to fit the applied pressure curve C1.

Step S25: Record pressure sensing information of the to-be-tested pressure sensor W' and thermometer information.

Step S26: Perform storage in real time and analyze a relationship between the pressure sensing information C2 and the applied pressure curve C1 and a relationship between the thermometer information and the temperature curve, and determine the test quantity for the to-be-tested pressure sensor W' and a service life of the to-be-tested pressure sensor W', to determine whether to turn off the device or perform a test again.

Similarly, in order to determine whether a pressure in the service life testing device 1' for a pressure sensor during force outputting is the same as a corresponding pressure on the applied pressure curve C1, a step following step S26 may be further included, that is, step S27: analyze, in real time, a correspondence between pressure sensing information C3 collected by the stage pressure gauge 31 and the applied pressure curve C1, to stop the test when it is determined that the pair of drivers 13 actuate abnormally.

Figure 8:
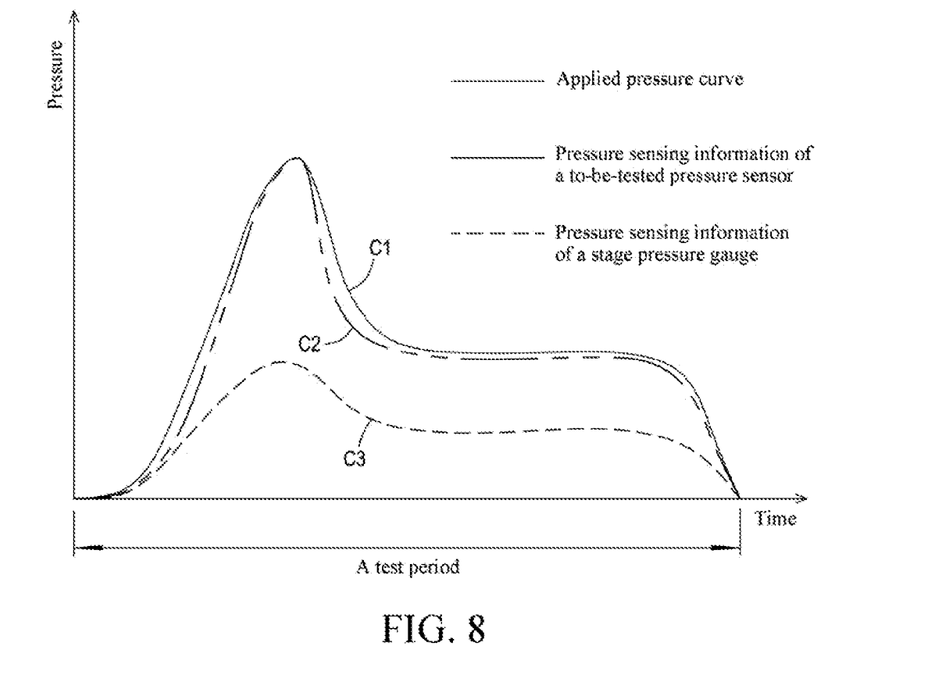
FIG. 8 is a curve graph showing an applied pressure curve, pressure sensing information recorded by a to-be-tested pressure sensor, and pressure sensing information recorded by a stage pressure gauge in a service life testing method for a pressure sensor according to an embodiment of the present invention.

FIG. 8 is a curve graph showing the applied pressure curve C1 between time and a pressure of the to-be-tested pressure sensor, the pressure sensing information C2 recorded by the to-be-tested pressure sensor on pressure-time coordinate axes, and the pressure sensing information C3 of the stage pressure gauge on the pressure-time coordinate axes in a test period of the service life testing method for a pressure sensor of the present invention. Force control is performed on the driver 13 based on the applied pressure curve C1, and an error comparison is performed on the pressure fed back by the stage, that is, the pressure sensing information C3 of the stage pressure gauge. If the pressure sensing information C3 of the stage pressure gauge deviates from a corresponding pressure value of the applied pressure curve C1, it is determined that components of the service life testing device (1, or 1') for a pressure sensor may have abnormalities, and the device needs to turned off to eliminate the abnormalities. By performing analysis on the pressure sensing information C2 recorded by the to-be-tested pressure sensor and the applied pressure curve C1, it can be determined whether the to-be-tested pressure sensor (W, or W') approaches to or reaches the end of the service life, and then the test quantity, that is, a span of the service life of the to-be-tested pressure sensor (W, or W') is measured.

The above embodiments merely exemplify the principles, features, and effects of the present invention, but are not intended to limit the implementation scope of the present invention. A person skilled in the art can modify or change the above embodiments without departing from the spirit and scope of the present invention. Any equivalent change or modification made using the contents disclosed by the present invention shall fall within the scope of the claims below.

What is claimed is:

1. A service life testing device for a pressure sensor, suitable for periodically testing a to-be-tested pressure sensor in a simulated application environment, wherein the to-be-tested pressure sensor comprises a sensing port configured to receive a pressure, the service life testing device comprising the following structures:
   a first plate, comprising a stage configured to carry the to-be-tested pressure sensor;
   a second plate, parallel to the first plate, and comprising a plate surface facing the stage;
   a pair of drivers, disposed between the first plate and the second plate, wherein a first end of each of the drivers is connected to the first plate, and a second end of each of the drivers opposite to the first end is connected to the second plate;
   a pair of linear slide mechanisms, disposed between the first plate and the second plate, and each comprising a slide rail and a slider moving linearly along the slide rail, wherein a compression spring is disposed along an axial direction of each of the slide rails;
   a jig, disposed between the first plate and the second plate, and facing the to-be-tested pressure sensor; and
   a processing unit, electrically connected to the pair of drivers and the to-be-tested pressure sensor, and configured to control a moving direction, a moving speed, and a moving stroke of the pair of drivers, to cause the to-be-tested pressure sensor to press against or move away from a surface of the jig.

2. The service life testing device for a pressure sensor according to claim 1, wherein a pair of limiting blocks are respectively disposed on the pair of slide rails between the first plate and the pair of compression springs.

3. The service life testing device for a pressure sensor according to claim 1, wherein the pair of drivers are motor drivers, cylinder drivers, or pneumatic tendon drivers.

4. The service life testing device for a pressure sensor according to claim 1, further comprising a stage pressure gauge electrically connected to the processing unit, and configured to measure a pressure actually applied on the to-be-tested pressure sensor by the pair of linear slide mechanisms.

5. The service life testing device for a pressure sensor according to claim 4, wherein the stage pressure gauge is disposed between the slider and the second plate or between the limiting block and the slide rail.

6. The service life testing device for a pressure sensor according to claim 4, wherein the to-be-tested pressure sensor is secured to the stage by a fixture disposed on the stage, the fixture comprises a first temperature control unit configured to control a temperature of the fixture, and the first temperature control unit is electrically connected to the processing unit, and wherein the jig comprises a second temperature control unit electrically connected to the processing unit.

7. The service life testing device for a pressure sensor according to claim 6, wherein the first temperature control unit comprises a first thermometer configured to measure the temperature of the fixture, and a second temperature control unit comprises a second thermometer configured to measure a temperature of the jig.

8. The service life testing device for a pressure sensor according to claim 6, wherein the first temperature control unit comprises a first cooling circulation unit disposed on the first plate, and the second temperature control unit comprises a second cooling circulation unit disposed on a connection pad.

9. The service life testing device for a pressure sensor according to claim 6, wherein a first thermal insulation member is disposed on a surface of the fixture in contact with the first plate, and a second thermal insulation member is disposed on a surface of the jig in contact with the second plate.

10. The service life testing device for a pressure sensor according to claim 6, wherein the to-be-tested pressure sensor comprises a temperature sensor configured to measure a temperature of the sensing port, and the temperature sensor is electrically connected to the processing unit.

11. A service life testing method for a pressure sensor, steps thereof comprising:

providing the service life testing device according to claim 6, wherein a preliminary stage, an initial stage, a pressurization stage, and a pressure reduction or pressure removal stage may be performed in the service life testing device, at the preliminary stage, the to-be-tested pressure sensor is separated from the surface of the jig, at the initial stage, the surface of the jig is in contact with the to-be-tested pressure sensor, at the pressurization stage, the jig is driven to move toward the fixture to increase a pressure applied on the to-be-tested pressure sensor by the surface of the jig, and at the pressure reduction or pressure removal stage, the jig is driven to stay away from the to-be-tested pressure sensor to reduce or remove a pressure on the to-be-tested pressure sensor;

setting a test environmental condition for the to-be-tested pressure sensor, the test environmental condition comprising a temperature curve of the temperatures of the jig and the fixture over time, an applied pressure curve of a pressure applied by the driver over time, and a test quantity;

driving, by the processing unit according to the temperature curve, the first temperature control unit and the second temperature control unit to heat the fixture and the jig;

driving, by the processing unit according to the applied pressure curve, the pair of drivers to actuate;

recording pressure sensing information of the to-be-tested pressure sensor and thermometer information; and performing storage in real time and analyzing a relationship between the pressure sensing information and the applied pressure curve and a relationship between the thermometer information and the temperature curve, and determining the test quantity for the to-be-tested pressure sensor and a service life of the to-be-tested pressure sensor, to determine whether to turn off the device or perform a test again.

12. The service life testing method for a pressure sensor according to claim 11, further comprising:

analyzing, in real time, a correspondence between information collected by the stage pressure gauge and the applied pressure curve, to stop the test when it is determined that the pair of drivers actuate abnormally.

13. A service life testing method for a pressure sensor, steps thereof comprising:

providing the service life testing device according to claim 1, wherein a preliminary stage, an initial stage, a pressurization stage, and a pressure reduction or pressure removal stage may be performed in the service life testing device, at the preliminary stage, the to-be-tested pressure sensor is separated from the surface of the jig, at the initial stage, the surface of the jig is in contact with the to-be-tested pressure sensor, at the pressurization stage, the jig is driven to move toward the fixture to increase a pressure applied on the to-be-tested pressure sensor by the surface of the jig, and at the pressure reduction or pressure removal stage, the jig is driven to stay away from the to-be-tested pressure sensor to reduce or remove a pressure on the to-be-tested pressure sensor;

setting a test environmental condition for the to-be-tested pressure sensor, the test environmental condition comprising an applied pressure curve and a test quantity;

driving, by the processing unit according to the test environmental condition, the pair of drivers to actuate for force control;

collecting and recording pressure sensing information of the to-be-tested pressure sensor; and performing storage in real time and analyzing a relationship between the pressure sensing information and the applied pressure curve, and determining the test quantity for the to-be-tested pressure sensor, to determine whether to turn off the device or perform a test again.

14. The service life testing method for a pressure sensor according to claim 13, further comprising: analyzing, in real time, a correspondence between information collected by the stage pressure gauge and the applied pressure curve, to stop the test when it is determined that the pair of drivers actuate abnormally.

* * * * *